United States Patent [19]

Näslund et al.

[11] Patent Number: 5,361,500
[45] Date of Patent: Nov. 8, 1994

[54] DE-VIBRATION ELEMENT

[75] Inventors: Ulf W. Näslund; Claes H. Losdahl, both of Huskvarna, Sweden

[73] Assignee: Aktiebolaget Electrolux, Sweden

[21] Appl. No.: 72,495

[22] Filed: Jun. 4, 1993

[30] Foreign Application Priority Data

Jul. 17, 1992 [SE] Sweden ................ 9202198-9

[51] Int. Cl.[5] ................................ B27B 17/00
[52] U.S. Cl. ........................ 30/381; 173/162.1
[58] Field of Search ........... 30/383, 514, 517, 166.3, 30/381; 267/170; 403/77, 114, 122; 173/162.1

[56] References Cited

U.S. PATENT DOCUMENTS

| 807,857 | 12/1905 | Palmenberg | 403/77 |
| 2,687,024 | 8/1954 | George | 403/114 |
| 3,728,793 | 4/1973 | Makinson et al. | 30/383 |
| 3,845,827 | 11/1974 | Schulin | 173/162.1 |
| 3,889,763 | 6/1975 | Dillon | 173/162.1 |
| 3,972,119 | 8/1976 | Bailey | 30/381 |
| 4,501,511 | 2/1985 | Albert, Jr. | 403/114 |
| 5,046,566 | 9/1991 | Dorner et al. | 30/381 |

FOREIGN PATENT DOCUMENTS 1224975  3/1971  United Kingdom ............ 30/383

*Primary Examiner*—Richard K. Seidel
*Assistant Examiner*—Hwei-Siu Payer
*Attorney, Agent, or Firm*—Pearne, Gordon, McCoy & Granger

[57] ABSTRACT

A de-vibration element for a handle portion of a motor saw includes a coil spring (10, 30) which is attached between the saw body (19, 39) and the handle portion (13) by an attachment device provided at each end of the spring. In order to increase the resilience of the spring during small load one of the attachment devices includes with an articulated connection which preferably, a ball joint (15, 17; 35, 37).

4 Claims, 1 Drawing Sheet

DE-VIBRATION ELEMENT

BACKGROUND OF THE INVENTION

The present invention relates to a de-vibration element for a handle portion of a motor saw, having a coil spring attached between the saw body and the handle portion by attachment means provided at each end of the spring.

Elements of this kind are commonly used in motor saws in order to minimize the transmission of vibrations from the saw body to the handle portion. In such known elements both ends of the spring are rigidly attached to the respective portion of the motor saw. The spring is dimensioned to provide the required stability at high load which results in the disadvantage that it is too rigid when the load is small, which in practice, occurs when the engine runs idle or at runaway speed. This means that the vibration level of the handle portion during small loads will be higher than would be preferable.

SUMMARY OF THE INVENTION

It is an object of the present invention to eliminate the above-noted disadvantages in the prior art and to provide a de-vibration element which, during an unloaded condition, provides a reduced vibration level without waiving the demand for sufficient stability during a loaded condition. This object has been obtained by means of a de-vibration element of the kind mentioned in the introduction which, according to the invention, is generally characterized in that one of the attachment means comprises an articulated connection means.

BRIEF DESCRIPTION OF THE DRAWING FIGURES

The invention will be described in more detail below with reference to the accompanying drawings, in which FIG. 1 is a longitudinal section of a first embodiment of the de-vibration element in accordance with the invention, FIG. 2 is an enlarged partial section showing of the de-vibration element of FIG. 1, and FIG. 3 is a longitudinal section of a second embodiment of the de-vibration element in accordance with the invention.

DETAILED DESCRIPTION OF THE PREFERRED EMBODIMENTS

Figure 1:
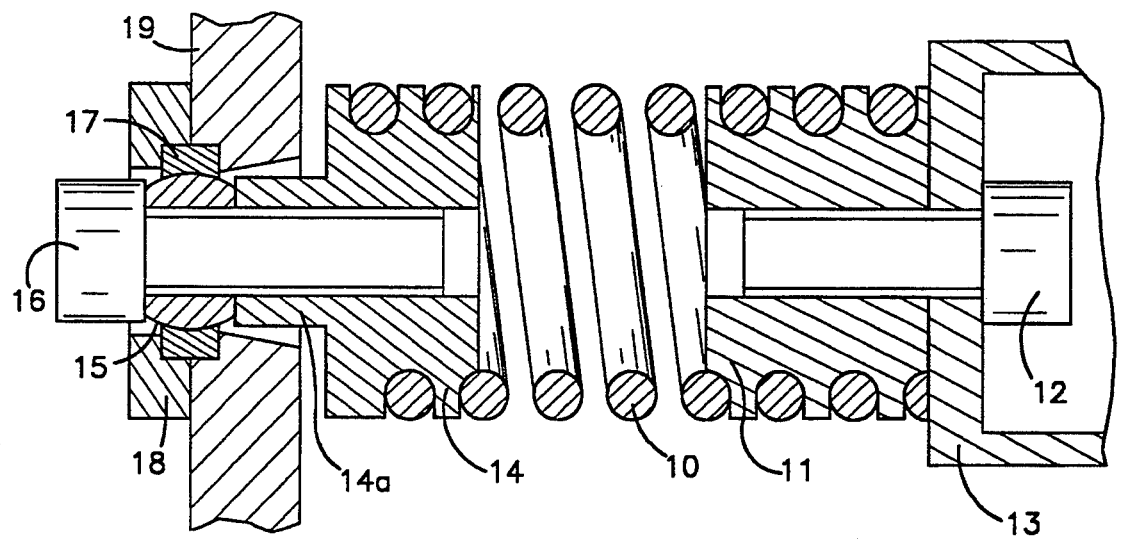

The de-vibration element shown in FIG. 1 comprises a coil spring 10, the right end of which is attached to a bracket 11 which, by means of a screw 12, is attached to a handle portion 13 of a motor saw. The left end of the spring 10 is attached to a bracket 14 to which a spherical inner portion 15 of a ball joint is attached by means of a screw 16. The portion 15 is surrounded by a bearing ring 17 having a complementary spherical supporting surface cooperating with the inner portion 15 to form a ball joint. The bearing ring 17 is attached by means of a clamp ring 18 to a wall 19 constituting a portion of the body of the motor saw.

Figure 2:
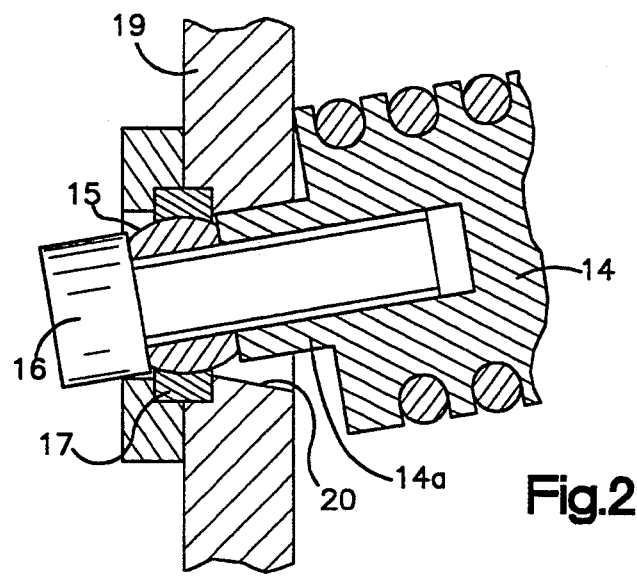

The wall has a conical opening 20 which at one side of the wall, is made as a seat for the bearing ring 17. The bracket 14 has a cylindrical extension 14a extending into the conical opening 20. As is best seen in FIG. 2, the conical opening 20 allows a certain limited oblique adjustment of the bracket 14. The angular movement is restricted in that the cylindrical portion 14a of the bracket 14 abuts the conical surface of the opening 20.

In the unloaded condition shown in FIG. 1, wherein the left end of the spring 10 is articulated to the saw body by the ball joint, the distance between the two supporting points of the spring is relatively long which means that the lever arm of lateral forces acting on the spring is long. Consequently, the spring has a relatively high resilience even to small loads which results in an improved vibration isolation. When the load increases so that the de-vibration element takes the position shown in FIG. 2, the mentioned lever arm will be considerably shorter. This means that the character of the spring is changed to a corresponding extent whereby its rigidity is increased and the spring is capable of resisting loadings occurring during operation of the saw without too much resilience which could have a negative effect on the handling of the saw. The improved vibration isolation at small load, such as when the saw engine runs idle, has thus been obtained at the same time as a high lateral stability is maintained. The element thereby meets the requirement of a proper function at low as well as high loading.

Figure 3:
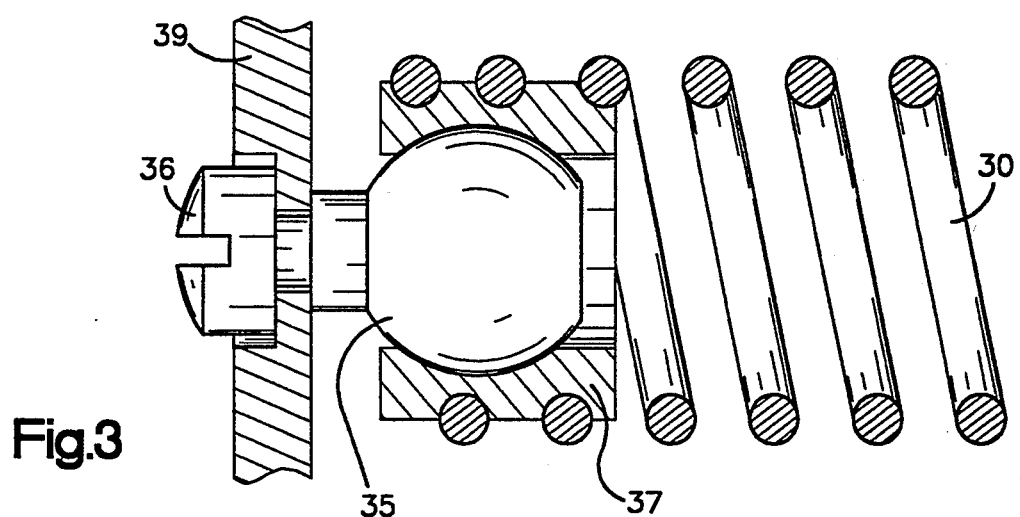

In the embodiment shown in FIG. 3, one end of a spring 30 is rigidly attached to a bearing ring 37 cooperating with a spherical inner portion 35 attached to a saw body 39 by means of a screw 36. The other end of the spring is attached to a handle portion (not shown) in the manner shown in FIG. 1. Due to the articulate connection between the spring and the saw body a weaker spring can be used which has a greater resilience to small lateral forces which results in an improved vibration isolation.

We claim:

1. A motor saw comprising a saw body, a handle portion, and a de-vibration element, said de-vibration element comprising a coil spring (10, 30) attached between the saw body (19, 39) and the handle portion (13) by attachment means provided at each end of the spring, wherein said attachment means comprises an articulated connection means (15, 17; 35, 37).

2. A motor saw according to claim 1, wherein the articulated connection means comprises a ball joint having a spherical inner portion (15) attached to one end of the spring (10), and a bearing ring (17) attached to one of the saw body (19) and the handle portion (13).

3. A motor saw according to claim 1 or 2, further comprising stop means (20) adapted to restrict angular movement of the connection means.

4. A motor saw according to claim 1, wherein the articulated connection means comprises a spherical inner portion (35) attached to one of the saw body and the handle portion, and a bearing ring (37) attached to one end of the spring (30).

* * * * *